United States Patent [19]
Buchanan

[11] Patent Number: 4,841,782
[45] Date of Patent: Jun. 27, 1989

[54] TARGET FLUID FLOW INDICATOR GAUGE

[75] Inventor: Steven O. Buchanan, Rolling Prairie, Ind.

[73] Assignee: Dwyer Instruments, Inc., Michigan City, Ind.

[21] Appl. No.: 95,432

[22] Filed: Sep. 11, 1987

[51] Int. Cl.$^4$ .............................................. G01F 1/28
[52] U.S. Cl. ............................. 73/861.74; 73/DIG. 5
[58] Field of Search ........... 73/861.74, 861.75, 861.76, 73/861.56, DIG. 5

[56] References Cited

U.S. PATENT DOCUMENTS

| | | | |
|---|---|---|---|
| 881,586 | 3/1908 | Howe-Gould | 73/861.75 |
| 3,862,416 | 1/1975 | Phillips et al. | 250/231 P |
| 4,030,365 | 6/1977 | Phillips et al. | 73/708 |
| 4,051,725 | 10/1977 | Schloss | 73/861.76 |
| 4,263,813 | 4/1981 | Gryn | 73/861.56 |

Primary Examiner—Herbert Goldstein
Attorney, Agent, or Firm—Mann, McWilliams, Zummer & Sweeney

[57] ABSTRACT

A target fluid flow indicator gauge comprising a non-magnetic housing defining a target chamber having a rounded portion that is curvilinear about an axial center that is coaxial with a fluid flow central axis through the gauge, with the chamber rounded portion lying in a plane that extends normally of such axial centers, a leaf spring mounted in the housing chamber and adjacent one end of the spring, which leaf spring at the other end of same has fixed to a rigid lever arm that mounts a disc-like target in centered relation within the chamber portion with the housing further defining inflow and outflow fluid ports on opposite sides of and centered on the axial centers and on the target for directing fluid flow against the target and out of the chamber; the lever arm carries a driving magnet assembly adjacent the target that is magnetically coupled through an imperforate wall structure of the housing to an externally located follower magnet assembly that acts through a short lever arm to pivot an indicator pointer that is journalled to pivot about an axis that extends crosswise of the fluid flow direction, to provide an output that is linear over the range of the gauge, with the leaf spring being adjustable to accommodate variant ranges of fluid flow rates.

10 Claims, 4 Drawing Sheets

TARGET FLUID FLOW INDICATOR GAUGE

The present invention relates to a target fluid flow indicator gauge, and more particularly, to a gauge arrangement for measuring the rate of liquid or gas flow through a conduit, and as an option, provides for remotely located control of the rate of fluid flow between high and low flow rate set points.

Air and liquid flow rate indicators commonly are arranged to have the fluid flow involved impinge against a target, the deflection of which gives an indication of the fluid flow rate. However, prior devices of this type have been subject to inaccuracies for various reasons, an important one of which the Applicant has found to be that the readout of the device becomes non-linear for a number of reasons, and the readout in any event may be adversely affected by target oscillations as the fluid moves about it.

A principal object of the invention is to provide a fluid flow rate indicator having a linear readout that permits the use of a linear scale and pointer therefor for directly reading fluid flow rate in terms of, for instance, gallons per minute, for liquids, and cubic feet per minute for gas or air (or the use of the metric system in providing the instrument readout).

Another principal object of the invention is to arrange the instrument so that its readout is effected by way of a magnetically coupled motion transmitting arrangement involving the use of permanent magnets to provide a magnetic coupling acting through an imperforate wall structure of the instrument housing that transmits the deflection of the target to a pivotally mounted pointer, while insuring that the target deflection under the fluid flow involved is linear, and that the leverage that effects pivoting of the pointer by way of the magnetic coupling involved is sufficiently short to avoid introducing non-linearity into the instrument readout.

Another principal object of the invention is to provide a fluid flow indicator gauge that will handle fluids at high temperatures and/or pressures, and that also may be corrosive, without affecting the accuracy of the instrument readout.

Still another principal object of the invention is to provide a gauge that effects measurement of a wide variety of fluid flows with minimal or no part change over being required, and that permits readily effected calibration for different flow ranges.

Still another important object of the invention is to provide a fluid flow indicator gauge that allows linear scale construction, that involves few and simple parts, that is easily installed and used, that is economical of manufacture, that is long lived in use , and that can optionally be equipped to provide for control of fluid flows between low and high set points.

In accordance with the present invention, a target fluid flow indicator gauge is provided for handling the flow of liquids and gases (including air) comprising a non-magnetic housing assembly that includes a housing member and a back plate therefor that, as assembled, define a target chamber including a rounded portion that is curvilinear about an axial center that is coaxial with a main fluid flow central axis through the gauge along which are provided inflow and outflow ports at opposite ends of the housing assembly that are centered on said fluid flow central axis, including the target chamber curvilinear portion to direct fluid flow through the target chamber curvilinear portion and out of the gauge in a predetermined fluid flow direction through the housing assembly that parallels and includes said main axial center. Mounted within the housing and exposed to the target chamber is an adjustable range spring in the form of a leaf spring cantilever mounted adjacent one end of same to dispose the leaf spring to extend toward the target chamber curvilinear portion. A lever arm affixed to the live end of the leaf spring extends diametrically across the target chamber curvilinear portion, the latter lying in a plane that extends normally of the target chamber curvilinear portion central axis. A target of round disc-like construction is anchored to the lever arm and disposed on the lever arm in centered relation in the target chamber curvilinear portion, coaxially of its axis, and in close fitting relation to the margining of same. The target mounting lever arm also has fixed to same, and adjacent the target, a driving magnet assembly that is magnetically coupled to a follower magnet assembly located externally of the housing, with the magnetic coupling acting through an imperforate wall structure of the housing that is of film thickness dimensions for forming a "window" for the magnetic flux involved.

The gauge externally of the housing includes an indicator pointer journaled to pivot about an axis that extends crosswise of the fluid flow direction, with the follower magnet assembly acting through a sufficiently short lever arm on the journaled pointer shaft to linearly deflect the pointer in proportion to the deflection of the target under the impetus of fluid flow experienced by the target.

By keeping the lever arm that the indicated follower magnet acts through to pivot the indicator pointer of small or short dimensions, the readout of the gauge is linear. The gauge is equipped with a linear scale, also located externally of the housing assembly, and underneath the indicator pointer, with both the indicator pointer and scale being enclosed by a suitable cover, a portion of which is transparent for easy reading of the gauge. The gauge scale may be in terms of gallons per minute if the flow rate of liquids is to be measured, or in terms of cubic feet per minute if the flow rate of gas or air is to be measured (and, of course, the metric system or any other commonly used flow measurement units may alternately be employed, as desired).

The range spring of the gauge is equipped for calibration, or for adjustment of the calibration, for different flow ranges.

The gauge of the invention can optionally be equipped for control of the flow rates between high and low flow rate set points by applying the principles of Phillips and Zoludow U.S. Pat. No. 3,862,416 (assigned to the same assignee as the instant application) to same, as will be brought out hereinafter.

Other objects, uses, and advantages will be obvious or become apparent from a consideration of the following detailed description and the application drawings, in which like reference numerals indicate like parts throughout the several views.

However, it is to be distinctly understood that the specific drawing illustrations provided are supplied primarily to comply with the requirements of the Patent Laws, and that the invention is susceptible of other embodiments or modifications that will be readily apparent to those skilled in the art, and are intended to be covered by the appended claims.

GENERAL DESCRIPTION

Figure 1:
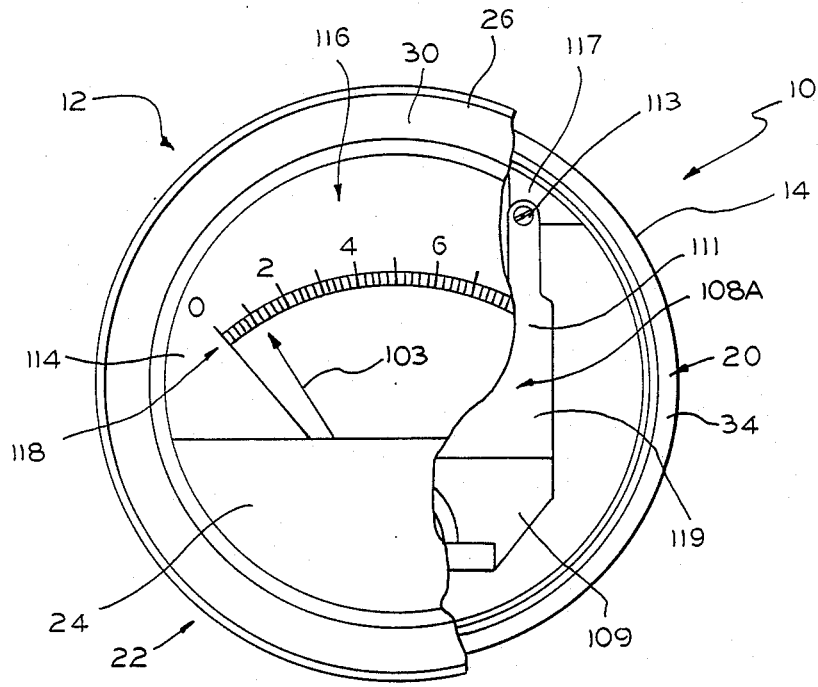
FIG. 1 is a top plan view of one embodiment of the invention, with parts broken away to expose other parts, including the gauge wishbone that pivotally mounts the gauge pointer that is shown cooperating with the gauge scale plate that overlies the gauge wishbone.
Figure 2:
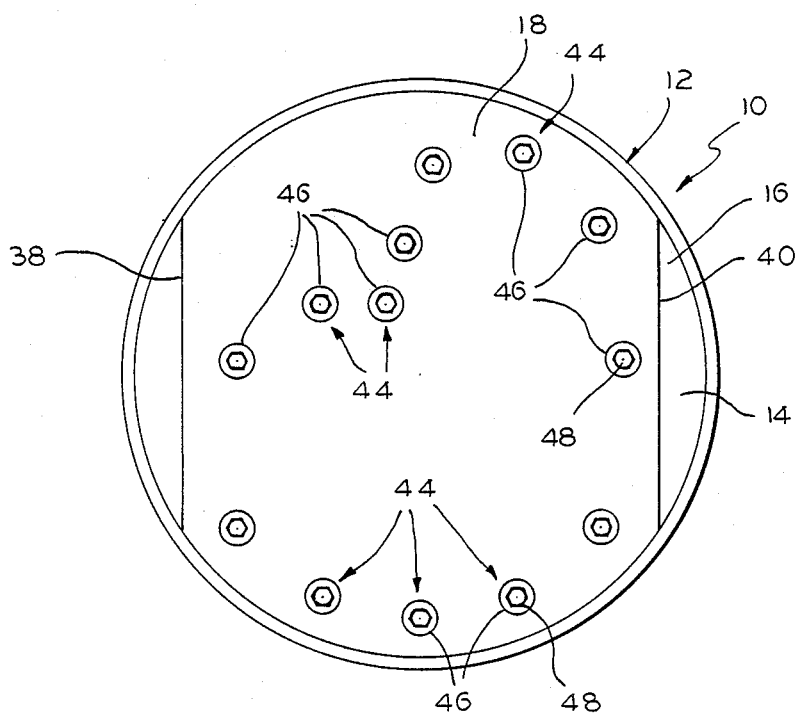
FIG. 2 is a back plan view of the gauge as shown in FIG. 1.
Figure 3:
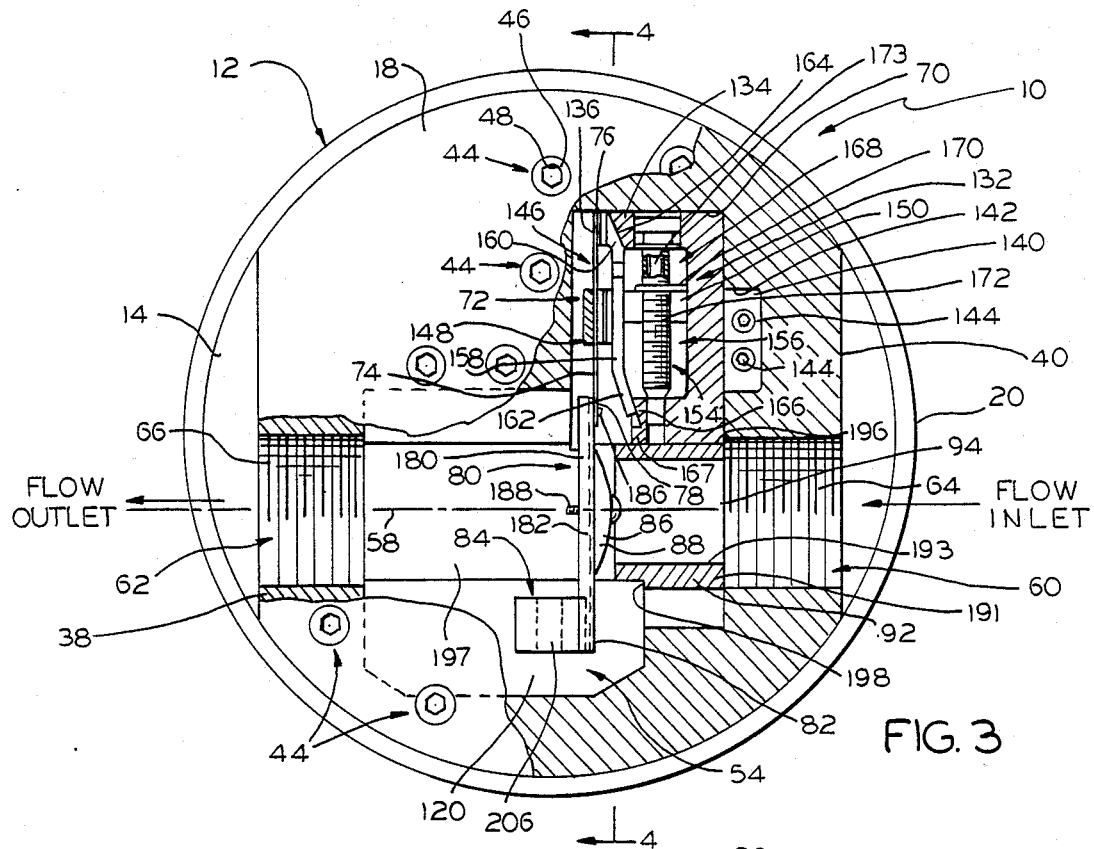
FIG. 3 is a back plan view of the gauge with the housing assembly involved being shown in section and broken away to expose important components of the invention.
Figure 4:
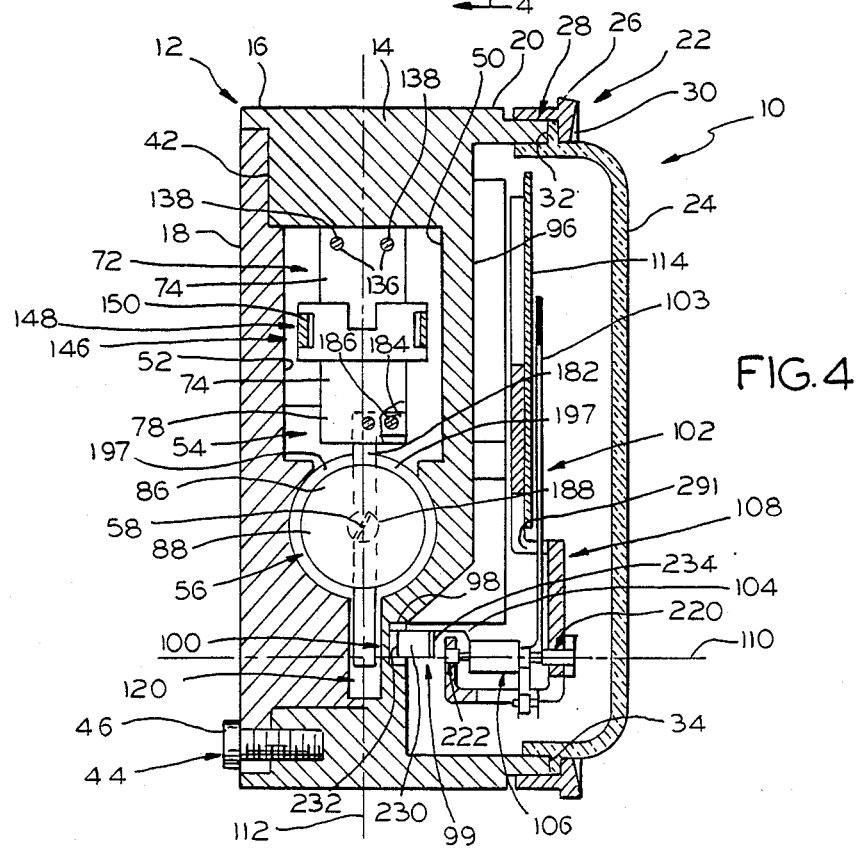
FIG. 4 is a sectional view through the gauge taken substantially along line 4—4 of FIG. 3.

Reference numeral 10 of FIGS. 1-4 generally indicates a target fluid flow indicator gauge comprising one embodiment of the present invention, which comprises housing assembly 12 that includes housing member 14 that is generally cylindrical in external configuration, and has applied to its base or back portion 16 a back cover plate 18, and that has applied to its front side 20 a cover 22 that in and of itself may be entirely conventional and as shown comprises a cover member 24 that is formed from a suitable transparent material (such as glass or a suitable plastic) and that is held in place by an annular clamp member or bezel 26 threadedly secured to the housing member 14 where indicated by reference numeral 28 (see FIG. 4). As illustrated, the bezel 26 includes an annular flange 30 that engages the annular flange 32 of the cover member for this purpose, to hold the cover member 24 against the rim 34 of housing member 14. As will be apparent, a suitable O ring seal may be interposed between the cover member flange 32 and the rim 34 of housing member 14 for sealing purposes, if so desired.

The housing member front side 20 is cylindrical in configuration thereabout; the housing member 14 to the rear of the housing member front side 20 defines planar end walls 38 and 40, with the housing member 14 being suitably recessed at its back side 16, as at 42, to receive the back plate 18, which is held in place by suitable screws 44 that pass through holes appropriately formed in the back plate 18 into correspondingly located threaded apertures formed in the housing member 14 for securing the back plate 18 to the housing member 14. The securement arrangement may be of any suitable type, that shown including an enlarged head 46 defining a hex shaped recess 48 to receive a suitable, correspondingly shaped, hex tool for threading screws 44 in place.

The housing member 14, the back plate 18, the bezel 26, and screws 44 are formed from materials that are of the non-magnetic type, such as aluminum or brass or alloys of same that are non-magnetic.

In the illustrated embodiments, inner surfacings 50 and 52 of the housing member 14 and its back plate 18 are shaped to define (see FIGS. 3 and 4) a target chamber 54 having a curvilinear or circular portion 56 that is curvilinear about axial center 58. The housing member 14 and back plate 18 also define suitable inflow port 60 and outflow port 62 that are both circular in configuration and are centered on the axis 58 that coincides with the axial center of the fluid flow that is to pass through gauges 10 and 10A (which axis is also represented by reference numeral 58). Ports 60 and 62 are internally threaded, as indicated at 64 and 66, respectively, for application thereto of the threaded ends of conduiting that will bring the fluid flow involved to the gauge 10 and take it away from the gauge 10 (the source and disposal of the fluid flow rate measured by the gauge 10 will depend on the nature of the application of gauge 10, as will be apparent to those skilled in the art). Ports 60 and 62 are coaxial with axis 58, as indicated in FIG. 3.

Figure 5:
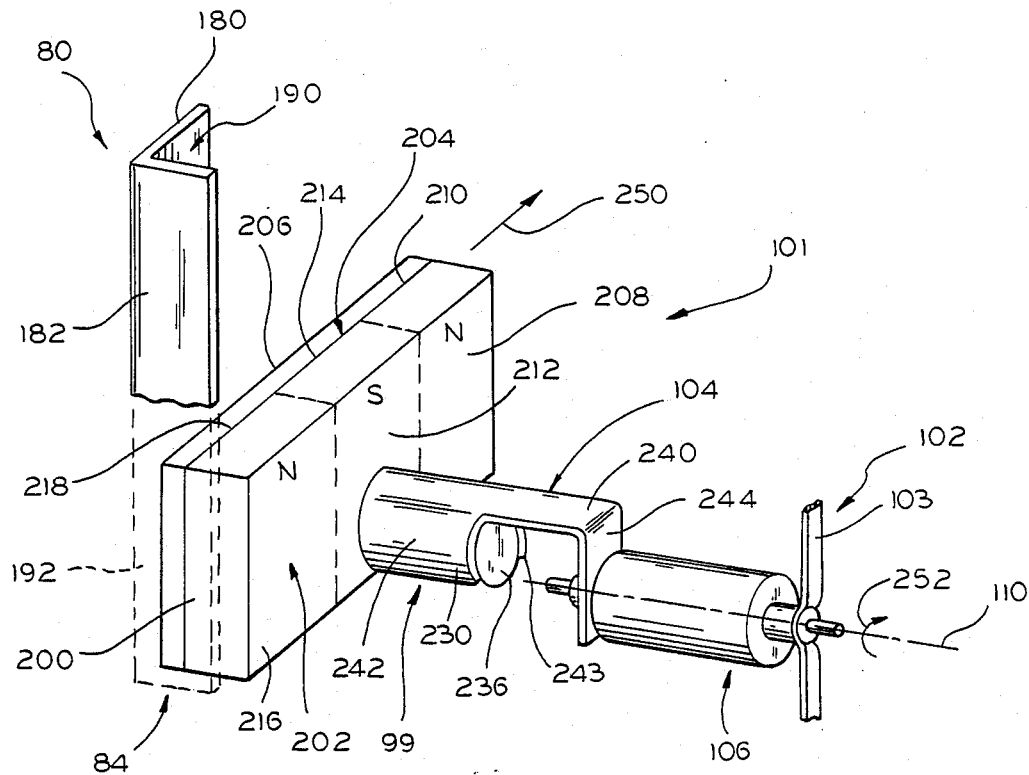
FIG. 5 is a diagrammatic perspective view illustrating the magnetically coupled motion transmitting arrangement employed in accordance with the invention, with the housing assembly wall that separates the two permanent magnet assemblies involved being omitted to simplify the drawings.

The housing member 14 is suitably recessed as at 70 (see FIG. 3) to receive an adjustable range spring assembly 72 that includes a leaf spring 74 that is cantilever mounted at its end 76, with the leaf spring 74 at its end 78 mounting a rigified lever member 80 that extends diametrically across the target chamber portion 56 and fixedly carries at its free end 82 a drive magnet assembly 84 (see FIGS. 3 and 5). Secured to the lever member 80 in centered relation with the target chamber portion 56, and specifically with its axis 58, is a disc type target 86 that may be formed from brass or the like, and is of convexo-concave configuration, with the convex side 88 of same facing the direction of fluid flow into and through the gauge 10.

In the form shown, the housing member 14 is equipped with tubular member 92 defining orifice 94 that is also centered on the axis 58.

The housing member 14 on its external front side 96 that faces cover 24 is formed with a slot or recess 98 (see FIG. 4) that is aligned with the drive magnet assembly 84 transversely of the gauge 10 and extends coterminously with, and is aligned with, the possible path of movement of the drive magnet assembly 84 (which as disclosed hereinafter is of limited length due to the limited length of the maximum deflection of target 86 that is contemplated by the present invention, as discussed in detail hereinafter). Disposed in the slot 98 is a follower magnet assembly 99 that is magnetically coupled through imperforate housing wall structure 100, that is integral with the housing member 14 for linear readout of indicator pointer assembly 102. The drive magnet assembly 84 and the follower magnet assembly 99 form a magnetically coupled motion transmitting device or assembly 101 (see FIG. 5).

The follower magnet assembly 99 is suitably affixed to arm 104 of suitable pointer shaft 106 (see FIGS. 4 and 5) that is suitably journalled in wishbone 108 to pivot about pivot axis 110 that extends normally to the plane of the movement path made by lever member 80 when instrument 10 is operating, which is represented by broken line 112 of FIG. 4.

The pointer assembly 102 includes a suitable pointer arm 103 that cooperates with suitable scale or dial plate 114 that is secured to the wishbone 108 in any suitable manner (ordinarily using screws that are not shown to avoid unnecessary detail), and that is visible through transparent cover 24. The dial or scale 114 has suitable indicia 116 (see FIG. 1) applied to same for reading the gauge in terms of fluid flow per unit of time, with the datum zero mark being diagrammatically illustrated at 118.

In accordance with the present invention, the target 86 and the chamber portion 56 that it is centered in on axis 58 are size minimized (the target is 0.775 inch in diameter in a working embodiment), and the lever arm or leverage that the follower magnet assembly 99 acts through to pivot pointer 102 about axis 110 is very short and preferably lies in the range of from about 0.100 inch to about 0.200 inch, and preferably is about 0.15 inch in length. The imperforate wall structure 100 of the housing member 14 is preferably of film thickness dimensions, and preferably lies in the range of from about 0.050 inch to about 0.070 inch (0.062 in a working embodiment), to form a magnetic flux passing "window" through which the magnetic flux of the drive magnet assembly 84 couples with the magnetic flux of the follower magnet assembly 99 for controlling the position of the pointer arm 103 relative to scale 116 when the gauge 10 experiences fluid flow therethrough in the manner indicated by the air flow direction indicated in FIG. 3.

The range spring assembly 72 is arranged so that it can be calibrated for different flow ranges, depending on the fluid to be measured by a gauge 10. As indicated, gauges 10 may be employed to measure fluid flow therethrough of liquids, gases including air, and fluids that are at high temperatures and/or pressures, or that may be corrosive in nature. It will be observed that in accordance with the present invention (see FIG. 5) the drive magnet assembly 84 and the gauge components that move with it are housed within the confines of the target chamber 54 that is defined by the housing member 14 and back plate 18. The pointer assembly 102 and the follower magnet assembly 99 that actuates same through the magnetic coupling (that is effected between the two magnet assemblies 84 and 99) are located externally of the housing assembly 12, and thus have no contact with the fluid involved in the fluid flow being measured by gauge 10. The wall structure 100 is of film thickness proportions to define the afore mentioned magnet flux "window", and is made imperforate to confine the fluid flow being measured to within the confines of housing assembly 12 (and the conduiting leading to and from same when a gauge 10 or 10A is installed).

Figure 7:
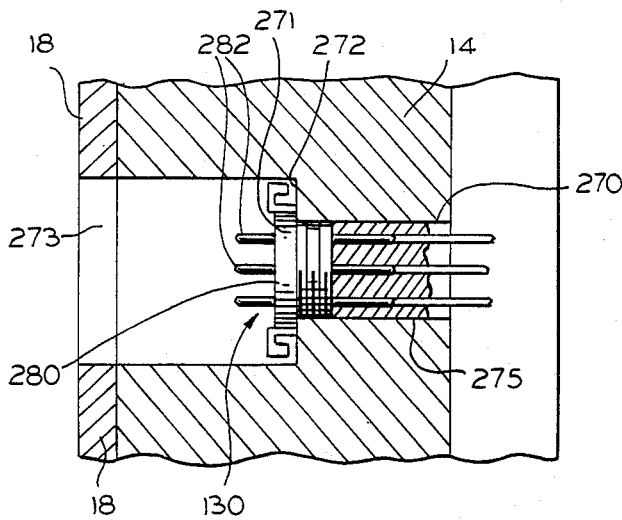
FIG. 7 is a fragmental sectional view substantially along line 7—7 of FIG. 6.
Figure 6:
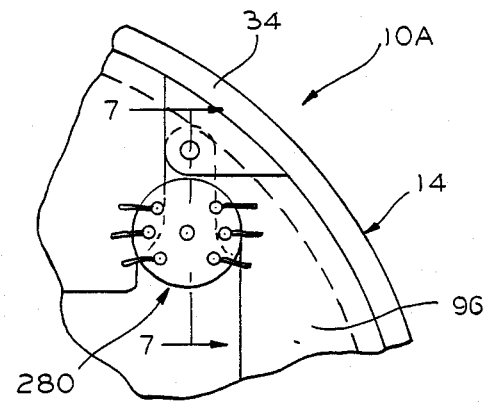
FIG. 6 is a fragmental front plan view of a modified embodiment of the gauge arranged for controlling the fluid flow measured by the gauge, in accordance with the afore identified Phillips and Zoludow U.S. patent.
Figure 8:
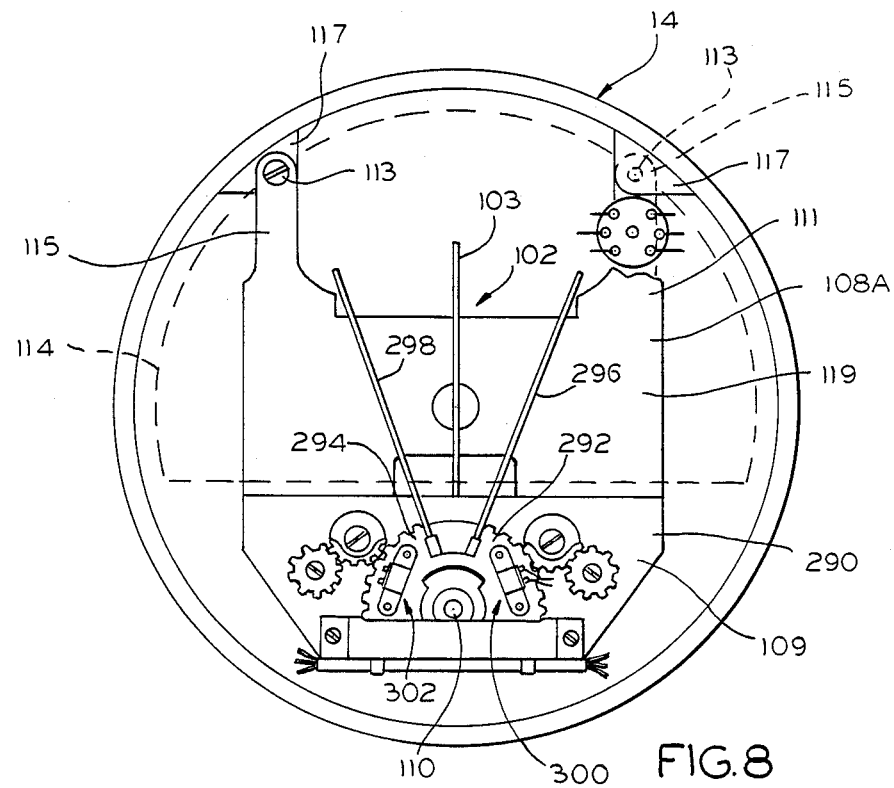
FIG. 8 is a top plan view of the modified gauge embodiment with the cover removed and showing the gauge as equipped for controlling the fluid flow rate between high and low flow rate set points in accordance with said Phillips and Zoludow patent.

As an optional feature of the invention, the gauge 10 may be converted into a fluid flow controller as well as providing the fluid flow measuring improvements provided by the embodiment of FIGS. 1–5, following the improvements disclosed in the aforereferred to Phillips and Zoludow U.S. Pat. No. 3,862,416 the disclosure of which is incorporated herein by this reference). The modified gauge 10A of FIGS. 6–8 is diagrammatically and fragmentally illustrated in FIGS. 6–8 to achieve this end as disclosed in some detail hereinafter. With this arrangement, control over the rate of fluid flow is obtained between high and low fluid flow rate set point, and the control may be remotely located from the fluid flow controlled.

SPECIFIC DESCRIPTION

The housing member 14 and its back plate 18 are suitably formed from aluminum or the like, or other non-magnetic material, to define the target chamber 54 and its curvilinear portion 56 as well as define the target chamber extension 120 in which the drive magnet assembly 84 operates. These components are also formed so that the target chamber 52 exposes the range spring assembly 72 to the fluid that is to be passed through the gauge 10 or 10A for measuring and/or control purposes.

When a gauge 10 is to be converted or provided as hereinafter disclosed to provide a fluid flow controller in addition to flow rate readout, and thus provide the gauge 10A of FIGS. 6–8, an aperture is drilled and counterbored in place and a pronged plug 130 (see FIG. 7) is applied and suitably sealed thereabout (this is discussed hereinafter in detail).

The range spring assembly 72 may be essentially of the type disclosed in Phillips and Troyer U.S. Pat. No. 4,030,365 (also assigned to the Assignee of the present application) and thus includes a leaf spring 74 that is cantilever mounted at its end 76 for range spring adjustable mounting of the lever member 80 and the parts carried thereby in the chamber 54. The leaf spring 74, for application in the present invention, is applied to a cradle 132 (see FIG. 3) proportioned for close fitting reception in housing member recess 70 and defining a first pedestal 134 to which the leaf spring 74 is affixed at its end 76 by appropriate screws 136 applied to the leaf spring holes 138 (see FIG. 4). The cradle 132, which may also be formed from aluminum or the like, includes a second pedestal 167 and integral tab 140 (see FIG. 3) that is secured to the housing member 14 in recess 142 provided for this purpose, by suitable screws 144, which may also be of the cap type.

The cradle 132 is arranged as disclosed in the indicated Phillips and Troyer U.S. Pat. No. 4,030,365 (the disclosure of which is also incorporated herein by this reference) to provide spring rate adjusting device 146 for calibrating the range spring assembly 72 including clamp device 148 that comprises the U-shaped clamping member 150 that is received over the leaf spring 74 and is moved along a trackway 154 by drive device 156; a clamp lock member 158 having ramped ends 160 and 162 cooperating with ramps 164 and 166 of the respective cradle pedestals 134 and 167, when moved by drive device 168, sets the clamp device 148 against the leaf spring 74 at the desired location for the range spring fulcrum.

As disclosed in said Phillips and Troyer U.S. patent, the drive device 156 comprises a non-rotating nut member 170 that threadedly receives drive screw 172 that is journalled for rotation between the cradle pedestals 134 and 167. Nut 170 is suitably keyed to clamp member 150 for movement therewith. The clamp lock member 158 is moved upwardly or downwardly of FIG. 3 by drive device 168 that is disclosed in said Phillips and Troyer patent and includes a separate nut member (not shown) threadedly received on a screw member 173 that is journalled between the cradle pedestals 134 and 167, with the drive screw 172 being tubular and the indicated screw member 173 of drive device 168 being received through the bore of drive screw 172. These two screw members 172 and 173 turn independently of each other by way of suitable turning tools being inserted through a port formed in the side wall of housing member 14 that, when the necessary adjustment in the range spring device has been made, is sealed closed by a suitable plug, similar to the arrangement of said Phillips and Troyer U.S. patent, to which reference may be had for a complete disclosure of the range spring adjustment component parts referred to.

Thus, the live length of the leaf spring 74 may be adjusted as needed to calibrate the gauge 10 for different flow ranges. As will be apparent to those skilled in the art, the spring range assembly 72 may be made suitably adjustable in any other convenient manner known to the art.

The lever member 80 comprises a length of a suitable inflexible material in sheet metal form defining flanges 180 and 182 that are at right angles to each other, with the flange 182 defining a head section 184 (that flange 182 is integral with) that is secured to the projecting end 78 of the leaf spring 74 by suitable screws 186 (see FIGS. 3 and 4). The target 86 is secured to the flange 182 of lever member 80 by suitable screw 188 in coaxial alignment with the axis 58, as indicated in FIGS. 3 and 4. Lever member 80 (which is in the nature of a lever arm in function) defines internal corner 190 (see FIG. 5) into which the drive magnet assembly 84 is suitably bonded at the other end 192 of lever member 80, so as to be disposed within the extension 120 of the target chamber 54 in confronting relation with the housing wall structure 100 that is interposed between the drive magnet assembly 84 and the follower magnet assembly 99.

As indicated, the target 86 may be in the form of a convexo-concave disc 88 that is centrally apertured to receive screw 188 for threadedly securing the target 86 to the lever member 80, and specifically to its flange 182 in the illustrated embodiment.

The orifice 92 comprises a tubular aluminum component 191 defining cylindrical bore 193 that is coaxially aligned with the axis 58, and a planar surfacing 196 that seats against the pedestal 167 of the cradle 132, as well as indentation 198, so as to be, fixedly secured between inflow inlet 60 and the target 86, in coaxial relation thereto, when the gauge components are assembled within the housing member 14, and the housing assembly back plate 18 is secured thereto (both the housing member 14 and the back plate 18 are internally configured to seat the orifice 92 in coaxial relation with target 86). The housing member 14 and its back plate 18 are shaped at their inner surfacings 50 and 52 to define the housing cylindrical conduit section 197 that orifice 92 communicates with, that is coaxially aligned with axis 58, and that extends between orifice 92 and the outflow port 66 (see FIG. 3).

The drive magnet assembly 84 comprises a magnet 200 that on surface 202 resides three pole faces 208, 212, and 216 that are each of the same parallelepiped configuration and are adjacent to each other forming a single planar surface 202, and affixed, as by employing a suitable adhesive to a backing plate 206 that may be formed from steel or the like.

Thus, magnet 200, on surface 202, defines three pole faces 208, 212 and 216 of alternate polarity. On surface 204, the magnet 200 further defines three pole faces 210, 214, 218 such that pole face 208 is opposed by pole face 210, pole face 212 is opposed by pole face 214 and pole face 216 is opposed by pole face 218. All of the pole faces 208, 212, 216, 210, 214, 218 are of the same size located as indicated in FIG. 5 on surfaces 202 and 204, though the pole faces 208, 212, and 216 are respectively of opposite polarity of the respective pole faces 210, 214, and 218.

The magnet 200 is of a suitable permanent type and is formed from a suitable high energy product material such as the barium ferrite magnet products sold by the D. M. Steward Mfg. Company of Chattanooga, Tennessee.

An energy product for magnet 200 in the range of from about 1 to about 3.75 million gauss-oersteds is preferred.

In accordance with the present invention, the magnet 200 is magnetized so that three pole faces 208, 212, 216 of alternate polarity are generated on surface 202.

In the form shown, the magnet 200 is applied to the backing plate 206 oriented to have the respective pole faces 208 and 216 of "North" polarity and the pole face 212 of a "South" polarity. As indicated, the magnet surface 202 and thus the pole faces 208, 212, 216 of the drive magnet assembly 84, is in confronting relation with the imperforate wall structure 100 that is of film thickness proportions, and accordingly is disposed oppositely of the follower magnet assembly 99. The pole faces 208, 212, and 216 of the drive magnet assembly 84 are in coplanar relation on surface 202 as indicated in FIG. 5 (which omits the wall structure 100 that is interposed between same and the follower magnet assembly 99).

It will be apparent that the functions of magnet 200 may be provided by separate permanent magnets of the same type serving the functions of magnet 200, and specifically, of its pole faces 208, 212, and 216.

The pointer assembly 102 comprises drive shaft 106 that is journaled by suitable jeweled assemblies 220 and 222 to wishbone 108, similar to the way the helix of the differential pressure gauge of the referred to Phillips and Troyer U.S. Pat. No. 4,030,365 is journaled (see FIG. 4 of that patent), with the drive shaft 106 being journaled to pivot about pivot axis 110 (and one of the jeweled pivot assemblies 220 or 222 being conventionally adjustable. Lever arm 104 is suitably affixed to drive shaft 106, employing adhesive, brazing, or the like, and mounts the follower magnet assembly 99 to pivot the drive shaft 106 about axis 110 in accordance with the deflection of the lever member 80 that results in corresponding deflection of the drive magnet assembly 84. The pointer arm 103 is suitable affixed to drive shaft 106 in any conventional manner to pivot therewith, in operative association with scale or dial plate 114. The pointer arm 103 may have operably associated therewith a suitable counter weight and support bracket therefor in accordance with known practices in this field for decreasing the forces needed to pivot the pointer arm 103 about its pivot axis 110.

The follower magnet assembly comprises a cylindrical magnet 230 defining oppositely facing planar pole faces 232 and 234 that are of opposite polarity. The magnet 230 may be formed from the same material, for instance, as magnet 200, with the magnet 230 being magnetized and oriented relative to the wall structure 100 such that the pole face 232 is of "North" polarity, and the pole face 234 is of "South" polarity. As better shown in FIG. 5, a steel plate 236 is magnetically adhered to the pole face 234 to concentrate therein its magnetic flux.

The nature of the lever arm 104 that secures the magnet 230 to the drive shaft 106 is better shown in FIG. 5, the arm 104 being is in the nature of a bracket plate 240 defining a pair of embracing side arms 242 and 243 on either side of same between which magnet 230 is received (it being suitably bonded to the bracket 240 employing a suitable adhesive), with the bracket 240 defining a laterally extending arm 244 that is suitably fixed to drive shaft 106. Bracket 240 is formed from a suitable non-magnetic material, such as brass.

It will thus be seen that with the pole face 232 of magnet 230 and pole face 212 of magnet 200 being of opposite polarity, the follower magnet 230 is in effect trapped within the magnetic flux emanating from the magnet pole faces 208, 212 and 216 of the drive magnet assembly 84, with housing wall pole structure 100 acting as a magnetic flux passing "window" through which the magnetic flux of the respective magnet assemblies 84 and 99 acts in controlling the position of the magnet 230, and thus pointer arm 103, through lever arm 104, relative to pivot axis 110. It follows that the deflection of the target 86 when it experiences fluid flow thereagainst, effects deflection of the drive magnet assembly 84 in the direction of arrow 250 (see FIG. 5), that results in the pointer 102 being pivoted in the direction of the arrow 252 (again see FIG. 5), about pivot axis 110. When the fluid flow ceases, the bias acting on the leaf spring 74 returns the drive magnet assembly 84 to its original position, with the result that the pointer 102 returns to the datum zero read out position.

The wishbone 108 is of the type disclosed in the aforementioned U.S. Pat. Nos. 3,862,416 and 4,030,365, and has the scale or dial plate 114 suitably affixed thereto as disclosed in said patents.

The assembly of the gauges 10 and 10A for volume flow rate measurement purposes is completed by applying to same the cover 22 in the same manner as disclosed in said Phillips and Troyer Pat. No. 4,030,365, except that the cover member 24 may be free of any adjustment devices having engagement therethrough for application to any of the components of the gauges 10 and 10A.

Referring now to FIGS. 6-8, should it be desirable that the gauge be also arranged to control the fluid flow, as between high and low pressure set points, the arrangement, for this purpose, of the aforementioned Phillips and Zoludow U.S. Pat. No. 3,862,416 may be employed to provide the gauge 10A, which basically is the same as shown in FIGS. 1-5, but modified in accordance with FIGS. 6-8.

As shown in FIGS. 6 and 7, one approach to this arrangement comprises a suitable aperture 270 drilled in place through the housing member 14. A pronged plug 280 is potted in place with the plug flange 271 butted against surface 272 formed by the intersection of the counterbored composite aperture 273 formed in back plate 18 and housing 14, and the portion of housing 14 in which the drilled aperture 270 is formed, with a suitable epoxy filling 275 in aperture 270. The pronged plug 280 defines extending prongs 282 externally accessible through aperture 273 to make the electrical connections indicated in the circuit of FIG. 17 of said Pat. No. 3,862,416 from outside of the plug 280, as indicated in FIGS. 4 and 14 of the same Patent. The plug 280 defines prongs that are accessible from the front of housing 14, and that are suitably electrically connected to prongs 282, and are sufficient in number to make the electrical connections for each wire involved in connection with the photocells and the penlight bulbs about to be described, which are shown in FIG. 8 applied to the wishbone 108A that is shown in FIG. 8. This may be done before the potting is applied, as indicated by FIG. 7.

In the showing of FIG. 8, the housing member 14 is the same as shown in FIGS. 1-4. The wishbone 108A is essentially the same as wishbone 108, and defines a free end 109 of same, with the other end 111 being secured cantilever fashion to the housing member 14 by suitable screws 113, which in the illustrated arrangement are applied to the respective wishbone legs 115 that are respectively mounted on suitable pedestals 117 defined by housing member 14, all as disclosed in said Phillips and Zoludow U.S. Pat. No. 3,862,416.

The pointer assembly 102 is journalled in the same manner as in connection with the gauge 10, and suitably affixed to the wishbone 108A is the dial plate 114, which is shown in dashed lines in the showing of FIG. 8 on top of the planar scale plate mounting portion 119 defined by wishbone 108A. Wishbone 108A is formed to define mounting panel portion 290 at the free end 109 of the wishbone and is offset outward of the level of portion 119 of the wishbone, to define a window opening 291 (not shown in FIG. 8, but see FIG. 4) through which the indicator arm 103 extends. As disclosed in said Phillips and Zoludow patent, mounted on the wishbone mounting portion 290 are a pair of gear segments 292 and 294 that respectively have secured thereto the respective set point arms 296 and 298, which also cooperate with the scale 116 on scale or dial plate 114, to provide, in accordance with the invention of said Phillips and Zoludow patent, switch control at selected high and low flows. This, of course, requires the application of cover arrangement of the type disclosed in said Phillips and Zoludow patent, to complete gauge 10A.

The respective gear segments 292 and 294 are mounted on the wishbone panel portion 290 for pivotal movement about the pivotal axis 110 of the pointer drive shaft 106. The respective gear segments 292 and 294 are equipped with turning knobs and connections thereto (not shown) in the manner fully disclosed in said Phillips and Zoludow patent, as indicated.

The respective gear segments 292 and 294 have adjustably mounted on same the respective photocells and associated light shields 300 and 302 of the type disclosed in said Phillips and Zoludow patent, which are arranged and associated with an appropriate long lived light bulb (not shown), whereby the set point arms 296 and 298 will set the high and low pressure functioning points of the respective photocells 300 and 302, as disclosed in said Phillips and Zoludow patent.

As further disclosed in said Phillips and Zoludow patent, the photocells 300 and 302 are incorporated with the indicated light bulb in the electrical circuiting that is diagrammatically illustrated in FIG. 17 (of said Phillips and Zoludow patent) to control the pair of switches (not shown) that are employed to provide the high pressure and low pressure controls possible utilizing the gauge 10A, as fully disclosed in said Phillips and Zoludow patent, which may be referred to for a complete disclosure relative to the control circuiting involved.

It will therefore be apparent that both the gauges 10 and 10A herein disclosed have a number of advantages.

For instance, both gauges can handle both liquids and gases, including air, at high temperatures/or pressures, that may be corrosive, since the fluid flow that is measured passes internally of the gauge and thus is fully sealed off from the gauge indicator pointer assembly. Both gauges can be mounted at any position of orientation relative to horizontal and vertical planes, such as in the horizontal position shown in FIG. 1 or in the upright positions shown in FIGS. 3 and 4, as well as upside down and backwards of these or any other positions of orientation, and provide the flow measurement benefits contemplated by the present invention, and without adverse effect.

Furthermore, the specific mounting arrangement of the drive and follower magnet assemblies 84 and 99, together with the relatively small size of the target 86 and the small amount of deflection of the target that is permitted by the disclosed instruments, as well as the freedom of the target from oscillation, insures a gauge linear read out, thereby permitting the use of a linear scale readout for the gauge.

Also, the basic instruments involved in utilizing the adjustable range spring device 72, permit any one instrument to be calibrated for different flow ranges. An associated advantage is that the gauges involved permit measurement of a wide variety of fluid flows with minimum part changeover or adjustment, which in connection with the disclosed gauges is concerned only with the size of the target and the adjustment of the range spring assembly 72.

It will also be appreciated that the general arrangement of the gauges herein disclosed permit utilization of the switching control features that are specifically disclosed in the Phillips and Zoludow U.S. Pat. No. 3,862,416. Where the gauge is arranged in this manner, it can be used to control flow rates in fluidic and pneumatic control systems, materials handling equipment, and as a flow alarm control, just to mention a few of the uses. Further, the control can be located remotely from the fluid flow that is being controlled, as from an instrument conveniently mounted on a control panel located at a centralized control facility of a commercial or industrial building.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A target fluid flow indicator gauge comprising:
   a housing formed from a non-magnetic material and defining a target chamber and fluid inflow and outflow ports disposed on opposite sides of said chamber and axially aligned to direct fluid flow into and out of said chamber in a predetermined fluid flow direction through said housing,
   a leaf spring cantilever mounted in said housing, adjacent one end of said leaf spring, for disposing said leaf spring to extend substantially crosswise of said fluid flow direction,
   said leaf spring being exposed to said chamber,
   a target centered in said direction of fluid flow within said chamber and fixed to the other end of said leaf spring for limited movement thereof in said direction of fluid flow when fluid flow through the housing impinges against said target,
   a driving magnet assembly carried by and movable with said target within said housing,
   an indicator pointer disposed externally of said chamber and journalled to pivot about an axis extending crosswise of said fluid flow direction,
   and a follower magnet assembly disposed externally of said chamber and being magnetically coupled to said driving magnet assembly and being fixed with respect to said indicator pointer to pivot said pointer about said axis,
   said housing including an imperforate wall structure of film thickness proportions separating said magnet assemblies, and the magnetic coupling of said magnet assemblies being through said wall structure,
   said driving magnet assembly comprising a permanent magnet means oriented to present side-by-side located pole faces, consecutively of said driving magnet assembly, of alternate polarity to said wall structure,
   said follower magnet assembly comprising a permanent magnet oriented to present to said wall structure a pole face of one of said polarities of said driving magnet assembly,
   said permanent magnet means pole faces of said driving magnet assembly being three in number in row form,
   with the pole face of said follower magnet assembly having a polarity that is the same as the polarity of the driving magnet assembly pole faces at the ends of said driving magnet assembly row.

2. A target flow indicator gauge comprising:
   a non-magnetic housing comprising a housing member and back plate therefor and as assembled defining a target chamber,
   a leaf spring cantilever mounted in said housing member and adjacent one end of said leaf spring for disposing said leaf spring to be exposed to and extend toward said target chamber,
   said target chamber including a rounded portion toward which said leaf spring extends,
   said target chamber rounded portion defining an axial center with which said chamber portion is coaxial, with said chamber portion lying in a plane that extends normally of said axial center,
   a target centered in said target chamber portion and comprising a round disc member,
   a lever arm fixed to the other end of said leaf spring and extending diametrically across said target chamber portion,
   said target being anchored to said lever arm and disposed to be positioned coaxially of said chamber portion and in close fitting relation therein,
   said housing member and back plate as assembled further defining fluid inflow and outflow ports on opposite sides of said chamber portion,
   said inflow and outflow ports being substantially centered on said target chamber portion and being aligned to direct fluid flow against and about said target and out of said chamber in a predetermined fluid flow direction through said housing,
   said lever arm having fixed to same a driving magnet assembly,
   an indicator pointer disposed to one side of said housing member and externally thereof, and being journalled to pivot about an axis that extends crosswise of said fluid flow direction,
   a follower magnet assembly disposed externally of said housing member on said one side thereof,
   said follower magnet assembly being fixed to said indicator pointer to pivot said pointer about said pivot axis through a leverage that has a length that lies in the range of from about 0.100 inch to about 0.200 inch, said magnet assemblies being in confronting relation and being separated by an imperforate wall structure of said housing member, through which wall structure said magnet assemblies are magnetically coupled, whereby said pointer movement under the movement induced in said follower magnet assembly by said drive magnet assembly is linear, said driving magnet assembly comprising a permanent magnet means oriented to present side-by-side located pole faces, consecutively of said driving magnet assembly, of alternate polarity to said wall structure, said follower magnet assembly comprising a permanent magnet oriented to present to said wall structure a pole face of one of said polarities of said driving magnet assembly, said permanent magnet means pole faces of said driving magnet assembly being three in number in row form, with the pole face of said follower magnet assembly having a polarity that is the same as the polarity of the driving magnet assembly pole faces at the ends of said driving magnet assembly row.

3. A target fluid flow indicator guage comprising:
a housing formed from a non-magnetic material and defining a target chamber and fluid inflow and outflow ports disposed on opposite sides of said chamber and axially aligned to direct fluid flow into and out of said chamber in a predetermined fluid flow direction through said housing, a leaf spring cantilever mounted in said housing, adjacent one end of said leaf spring, for disposing said leaf spring to extend substantially crosswise of said fluid flow direction, said leaf spring being exposed to said chamber, a target centered in said direction of fluid flow within said chamber and fixed to the other end of said leaf spring for limited movement thereof in said direction of fluid flow when fluid flow through the housing impinges against said target, a driving magnet assembly carried by and movable with said target within said housing, an indicator pointer disposed externally of said chamber and journalled to pivot about an axis extending crosswise of said fluid flow direction, and a follower magnet assembly disposed externally of said chamber and being magnetically coupled to said driving magnet assembly and being fixed with respect o said indicator pointer to pivot said pointer about said axis, said housing including an imperforate wall structure of film thickness proportions separating said magnet assemblies, and the magnetic coupling of said magnet assemblies being through said wall structure, said follower magnet assembly acting, in following the movement of said driving magnet assembly, to pivot said pointer about said axis through a leverage having a length which lies in the range of from about 0.100 to about 0.200 inch.

4. The target fluid flow indicator gauge set forth in claim 3 wherein:
said driving magnet assembly comprises a permanent magnet means oriented and configured relative to said imperforate wall to present a plurality of side-by-side located planar pole faces, in coplanar relation, and in row form, consecutively of said driving magnet assembly, and of alternate polarities, to said wall structure, with said permanent magnet means pole faces of said driving magnet assembly being sufficient in number that the pole faces thereof at the ends of said assembly row are of like polarity, said follower magnet assembly comprising a permanent magnet oriented and configured to present to said wall structure a planar pole face of a polarity that is the same as the polarity of said driving magnet assembly row end pole faces.

5. The target fluid flow indicator gauge set forth in claim 3 including:
a scale located externally of said housing adjacent said pointer that is calibrated for linear readout of fluid flow in said fluid flow direction per unit of time, by an observer, using said pointer positioned relative to said scale, on deflection of said target, in said fluid flow direction.

6. The target fluid flow indicator gauge set forth in claim 3 wherein:
said leaf spring has a live length that includes said other end of said leaf spring, with said live length of said leaf spring being adjustable to accommodate variant ranges of fluid flow rates.

7. A target fluid flow indicator gauge comprising:
a non-magnetic housing comprising a housing member and back plate therefor and as assembled defining a target chamber, a leaf spring cantilever mounted in said housing member and adjacent one end of said leaf spring for disposing said leaf spring to be exposed to and extend toward said target chamber, said target chamber including a rounded portion toward which said leaf spring extends, said target chamber rounded portion defining an axial center with which said chamber portion is coaxial, with said chamber portion lying in a plane that extends normally of said axial center, a target centered in said target chamber portion and comprising a round disc member, a lever arm fixed to the other end of said leaf spring and extending diametrically across said target chamber portion, said target being anchored to said lever arm and disposed to be positioned coaxially of said chamber portion and in close fitting relation therein, said housing member and back plate as assembled further defining fluid inflow and outflow ports on opposite sides of said chamber portion, said inflow and outflow ports being substantially centered on said target chamber portion and being aligned to direct fluid flow against and about said target and out of said chamber in a predetermined fluid flow direction through said housing, said lever arm having fixed to same a driving magnet assembly, an indicator pointer disposed to one side of said housing member and externally thereof, and being journalled to pivot about an axis that extends crosswise of said fluid flow direction, a follower magnet assembly disposed externally of said housing member on said one side thereof, said follower magnet assembly being fixed to said indicator pointer to pivot said pointer about said pivot axis through a leverage that lies in a range of from about 0.100 inch to about 0.200 inch, said magnet assemblies being in confronting relation and being separated by an imperforate wall structure of said housing member, through which wall structure said magnet assemblies are magnetically coupled, whereby said pointer movement under the movement induced in said follower magnet assembly by said drive magnet assembly is linear, said driving magnet assembly comprising a permanent magnet means oriented and configured relative to said imperforate wall to present a plurality of side-by-side polar pole faces, in coplanar relation, and in row form, consecutively of said driving magnet assembly, and of alternate polarities, to said wall structure, with said permanent magnet means pole faces of said driving magnet assembly being sufficient in number that the pole faces thereof at the ends of said assembly row are of like polarity, said follower magnet assembly comprising a permanent magnet oriented and configured to present to said wall structure a planar pole face of a polarity that is the same as the polarity of said driving magnet assembly row end pole faces.

8. The target fluid flow indicator gauge set forth in claim 7 wherein:
   the thickness of said imperforate wall structure lies in the range of from about 0.050 inch to about 0.070 inch.

9. The target fluid flow indicator gauge set forth in claim 7 including:
   a scale located externally of said housing member side adjacent and under said pointer that is calibrated for linear readout of fluid flow in said fluid flow direction per unit of time, by an observer, using said pointer positioned relative to said scale, on deflection of said target, in said fluid flow direction.

10. The target fluid flow indicator gauge set forth in claim 7 wherein:
    said leaf spring has a live length that includes said other end of said leaf spring,
    with said live length of said leaf spring being adjustable to accommodate variant ranges of fluid flow rates.

* * * * *